United States Patent
Shaw et al.

(10) Patent No.: US 11,102,131 B2
(45) Date of Patent: Aug. 24, 2021

(54) METHOD AND APPARATUS FOR DYNAMICALLY ADAPTING A SOFTWARE DEFINED NETWORK

(71) Applicant: AT&T Intellectual Property I, L.P., Atlanta, GA (US)

(72) Inventors: Venson Shaw, Kirkland, WA (US); Zhi Cui, Sugar Hill, GA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 74 days.

(21) Appl. No.: 16/568,323

(22) Filed: Sep. 12, 2019

(65) Prior Publication Data

US 2020/0007451 A1  Jan. 2, 2020

Related U.S. Application Data

(62) Division of application No. 15/340,694, filed on Nov. 1, 2016, now Pat. No. 10,454,836.

(51) Int. Cl.
*H04L 12/851* (2013.01)
*H04L 12/24* (2006.01)
*H04L 12/26* (2006.01)

(52) U.S. Cl.
CPC .......... *H04L 47/24* (2013.01); *H04L 41/0806* (2013.01); *H04L 41/5019* (2013.01); *H04L 41/5025* (2013.01); *H04L 43/0876* (2013.01)

(58) Field of Classification Search
None
See application file for complete search history.

(56) References Cited

U.S. PATENT DOCUMENTS

| | | |
|---|---|---|
| 4,285,469 A | 8/1981 | Huang |
| 5,671,253 A | 9/1997 | Stewart |

(Continued)

FOREIGN PATENT DOCUMENTS

| | | |
|---|---|---|
| CN | 102045896 A | 5/2011 |
| CN | 105227385 A | 1/2016 |

(Continued)

OTHER PUBLICATIONS

"Cell Site on Light Trucks", 2007, 1 page.
(Continued)

*Primary Examiner* — Andre Tacdiran
(74) *Attorney, Agent, or Firm* — Guntin & Gust, PLC; Ralph Trementozzi

(57) ABSTRACT

Aspects of the subject disclosure may include, for example, receiving a first service request via a network, transmitting a query to service layer equipment, and receiving, from the service layer equipment, first service requirements to fulfill the first service request. Responsive to receiving the first service requirements, a request for network resource capacity information is transmitted to instantiated software defined network (SDN) controllers. Network capacity information is received from the instantiated SDN controllers and an insufficiency thereof is determined according to the service requirements and the network capacity information. Another software defined network controller is instantiated into the network, responsive to the determined insufficiency, to fulfill the first service request. The first service requirements are met, in part, by the instantiated software defined network controllers that are instantiated and, in part, by the other software defined network controller. Other embodiments are disclosed.

20 Claims, 6 Drawing Sheets

(56) References Cited

U.S. PATENT DOCUMENTS

| | | | |
|---|---|---|---|
| 5,970,408 A | 10/1999 | Carlsson et al. | |
| 6,246,883 B1 | 6/2001 | Lee | |
| 6,542,500 B1 | 4/2003 | Gerszberg et al. | |
| 6,795,686 B2 | 9/2004 | Master et al. | |
| 6,873,620 B1 | 3/2005 | Coveley et al. | |
| 6,917,622 B2* | 7/2005 | McKinnon, III | H04L 43/00 370/420 |
| 7,167,923 B2 | 1/2007 | Lo et al. | |
| 7,206,294 B2 | 4/2007 | Garahi et al. | |
| 7,532,640 B2 | 5/2009 | Kelly et al. | |
| 7,660,583 B2 | 2/2010 | Pekonen et al. | |
| 7,787,414 B2 | 8/2010 | Le Faucheur et al. | |
| 8,145,208 B2 | 3/2012 | Chari et al. | |
| 8,150,421 B2 | 4/2012 | Ward et al. | |
| 8,234,650 B1 | 7/2012 | Eppstein et al. | |
| 8,385,977 B2 | 2/2013 | Fein et al. | |
| 8,593,968 B2 | 11/2013 | Santiago et al. | |
| 8,621,058 B2 | 12/2013 | Eswaran et al. | |
| 8,676,219 B2 | 3/2014 | Lennvall et al. | |
| 8,868,069 B2 | 10/2014 | Bennett et al. | |
| 9,078,284 B2 | 7/2015 | Richardson | |
| 9,119,016 B2 | 8/2015 | Durand et al. | |
| 9,185,545 B2 | 11/2015 | Yeoum et al. | |
| 9,225,587 B2 | 12/2015 | Zhang et al. | |
| 9,225,652 B2 | 12/2015 | Li et al. | |
| 9,245,246 B2 | 1/2016 | Breitgand et al. | |
| 9,298,515 B2 | 3/2016 | McMurry et al. | |
| 9,301,333 B2 | 3/2016 | Chin et al. | |
| 9,305,301 B2 | 4/2016 | Paul et al. | |
| 9,306,909 B2 | 4/2016 | Koponen et al. | |
| 9,311,108 B2 | 4/2016 | Cummings | |
| 9,330,156 B2 | 5/2016 | Satapathy | |
| 9,369,390 B2 | 6/2016 | Bantukul et al. | |
| 9,391,897 B2 | 7/2016 | Sparks et al. | |
| 9,392,471 B1 | 7/2016 | Thomas et al. | |
| 9,401,962 B2 | 7/2016 | Parker et al. | |
| 9,407,542 B2 | 8/2016 | Vasseur et al. | |
| 9,436,443 B2 | 9/2016 | Chiosi et al. | |
| 9,445,341 B2 | 9/2016 | Spinelli et al. | |
| 9,450,817 B1* | 9/2016 | Bahadur | H04L 41/0806 |
| 9,450,823 B2 | 9/2016 | Rhee et al. | |
| 9,461,729 B2 | 10/2016 | Djukic et al. | |
| 9,497,572 B2 | 11/2016 | Britt et al. | |
| 9,503,371 B2 | 11/2016 | Thakkar et al. | |
| 9,503,969 B1 | 11/2016 | Zakaria et al. | |
| 9,516,597 B2 | 12/2016 | Tabatabaei Yazdi et al. | |
| 9,544,120 B2 | 1/2017 | Scholten et al. | |
| 9,559,980 B2 | 1/2017 | Li et al. | |
| 9,565,074 B2 | 2/2017 | Lehane et al. | |
| 9,602,422 B2 | 3/2017 | Padmanabhan et al. | |
| 9,674,707 B2 | 6/2017 | Boettcher et al. | |
| 9,853,898 B1 | 12/2017 | Subramanian et al. | |
| 9,860,288 B2 | 1/2018 | Lockhart et al. | |
| 9,961,016 B2 | 5/2018 | Ringland et al. | |
| 10,034,222 B2 | 7/2018 | Zhang et al. | |
| 10,039,006 B2 | 7/2018 | Shaw et al. | |
| 10,103,991 B2 | 10/2018 | Agarwal et al. | |
| 10,146,319 B2 | 12/2018 | Tannenbaum et al. | |
| 10,204,505 B2 | 2/2019 | Honjo et al. | |
| 10,536,925 B2 | 1/2020 | Talebi Fard et al. | |
| 10,542,543 B2 | 1/2020 | Yerramalli et al. | |
| 10,548,131 B2 | 1/2020 | Yerramalli et al. | |
| 10,652,889 B2 | 5/2020 | Yerramalli et al. | |
| 2003/0058707 A1 | 3/2003 | Dilger et al. | |
| 2003/0134629 A1 | 7/2003 | Ollis et al. | |
| 2003/0145106 A1 | 7/2003 | Brown et al. | |
| 2003/0152034 A1 | 8/2003 | Zhang et al. | |
| 2004/0071086 A1 | 4/2004 | Haumont et al. | |
| 2004/0103308 A1 | 5/2004 | Paller et al. | |
| 2007/0022191 A1* | 1/2007 | Miao | H04L 41/0803 709/223 |
| 2007/0140269 A1 | 6/2007 | Donnelli et al. | |
| 2007/0259661 A1 | 11/2007 | Hurtta et al. | |
| 2007/0294668 A1 | 12/2007 | Mohindra et al. | |
| 2008/0285492 A1 | 11/2008 | Vesterinen et al. | |
| 2009/0265542 A1 | 10/2009 | Khetawat et al. | |
| 2009/0296827 A1 | 12/2009 | Karaoguz et al. | |
| 2010/0017506 A1 | 1/2010 | Fadell | |
| 2010/0234071 A1 | 9/2010 | Shabtay et al. | |
| 2011/0087796 A1 | 4/2011 | Littlejohn et al. | |
| 2011/0116499 A1 | 5/2011 | Lim et al. | |
| 2011/0182227 A1 | 7/2011 | Rune et al. | |
| 2011/0237281 A1 | 9/2011 | Busropan et al. | |
| 2011/0238840 A1 | 9/2011 | Shi et al. | |
| 2011/0282931 A1 | 11/2011 | Chen et al. | |
| 2011/0292896 A1 | 12/2011 | Yeuom et al. | |
| 2011/0295700 A1 | 12/2011 | Gilbane et al. | |
| 2012/0087279 A1 | 4/2012 | Rinne et al. | |
| 2012/0140749 A1 | 6/2012 | Caldwell et al. | |
| 2012/0184266 A1 | 7/2012 | Faccin et al. | |
| 2012/0236716 A1 | 9/2012 | Anbazhagan et al. | |
| 2012/0303828 A1 | 11/2012 | Young et al. | |
| 2013/0010756 A1 | 1/2013 | Liang et al. | |
| 2013/0072199 A1 | 3/2013 | Miyagawa et al. | |
| 2013/0337872 A1 | 12/2013 | Fertl et al. | |
| 2014/0023044 A1 | 1/2014 | Sjølinder et al. | |
| 2014/0059194 A1* | 2/2014 | Robb | G06F 9/5072 709/223 |
| 2014/0070892 A1 | 3/2014 | Matsuoka et al. | |
| 2014/0143378 A1 | 5/2014 | Bhupalam et al. | |
| 2014/0237108 A1* | 8/2014 | Kurabayashi | G06F 9/505 709/224 |
| 2014/0254382 A1 | 9/2014 | Randriamasy et al. | |
| 2014/0259012 A1 | 9/2014 | Nandlall et al. | |
| 2014/0269435 A1 | 9/2014 | McConnell et al. | |
| 2014/0282877 A1 | 9/2014 | Mahaffey et al. | |
| 2014/0307556 A1 | 10/2014 | Zhang et al. | |
| 2014/0317293 A1 | 10/2014 | Shatzkamer et al. | |
| 2014/0337500 A1 | 11/2014 | Lee | |
| 2014/0349611 A1 | 11/2014 | Kant et al. | |
| 2014/0376454 A1 | 12/2014 | Boudreau et al. | |
| 2015/0063101 A1* | 3/2015 | Touati | H04W 28/0268 370/230 |
| 2015/0109967 A1 | 4/2015 | Hogan et al. | |
| 2015/0113100 A1 | 4/2015 | Tweedale et al. | |
| 2015/0139238 A1 | 5/2015 | Pourzandi et al. | |
| 2015/0146716 A1 | 5/2015 | Olivier et al. | |
| 2015/0154258 A1 | 6/2015 | Xiong et al. | |
| 2015/0172115 A1 | 6/2015 | Nguyen et al. | |
| 2015/0188949 A1 | 7/2015 | Mahaffey et al. | |
| 2015/0257012 A1 | 9/2015 | Zhang | |
| 2015/0257038 A1 | 9/2015 | Scherzer | |
| 2015/0271276 A1* | 9/2015 | Edlund | G06F 9/5055 709/224 |
| 2015/0295833 A1 | 10/2015 | Mizukoshi et al. | |
| 2015/0296459 A1 | 10/2015 | Tabatabaei Yazdi et al. | |
| 2015/0319078 A1 | 11/2015 | Lee et al. | |
| 2015/0341187 A1 | 11/2015 | Diwane et al. | |
| 2015/0350102 A1 | 12/2015 | Leon-garcia et al. | |
| 2015/0378753 A1 | 12/2015 | Phillips et al. | |
| 2015/0382278 A1 | 12/2015 | Fallon et al. | |
| 2016/0014787 A1 | 1/2016 | Zhang et al. | |
| 2016/0021588 A1 | 1/2016 | Kamdar et al. | |
| 2016/0021684 A1 | 1/2016 | Lewis et al. | |
| 2016/0041427 A1 | 2/2016 | Wang et al. | |
| 2016/0044136 A1 | 2/2016 | Schiff et al. | |
| 2016/0062746 A1 | 3/2016 | Chiosi et al. | |
| 2016/0072669 A1 | 3/2016 | Saavedra | |
| 2016/0073278 A1 | 3/2016 | Roessler et al. | |
| 2016/0080484 A1 | 3/2016 | Earl | |
| 2016/0088092 A1 | 3/2016 | Cardona-Gonzalez et al. | |
| 2016/0094668 A1 | 3/2016 | Chang et al. | |
| 2016/0095019 A1 | 3/2016 | Cui et al. | |
| 2016/0095042 A1 | 3/2016 | Wadhwa | |
| 2016/0105821 A1 | 4/2016 | Senarath et al. | |
| 2016/0105893 A1 | 4/2016 | Senarath et al. | |
| 2016/0112335 A1 | 4/2016 | Bouanen et al. | |
| 2016/0112903 A1 | 4/2016 | Kaushik et al. | |
| 2016/0113018 A1 | 4/2016 | Li | |
| 2016/0127230 A1 | 5/2016 | Cui et al. | |
| 2016/0127239 A1 | 5/2016 | Kahn et al. | |
| 2016/0142282 A1 | 5/2016 | Guo | |
| 2016/0142427 A1 | 5/2016 | De Los Reyes et al. | |
| 2016/0149815 A1 | 5/2016 | Cotter | |

(56) References Cited

U.S. PATENT DOCUMENTS

| | | |
|---|---|---|
| 2016/0150421 A1 | 5/2016 | Li et al. |
| 2016/0150448 A1 | 5/2016 | Perras et al. |
| 2016/0156513 A1 | 6/2016 | Zhang et al. |
| 2016/0164787 A1 | 6/2016 | Roach et al. |
| 2016/0174191 A1 | 6/2016 | Singh et al. |
| 2016/0182288 A1* | 6/2016 | Maenpaa ............... H04L 65/60 709/220 |
| 2016/0183156 A1 | 6/2016 | Chin et al. |
| 2016/0212017 A1 | 7/2016 | Li et al. |
| 2016/0218948 A1 | 7/2016 | Djukic |
| 2016/0218971 A1 | 7/2016 | Basunov |
| 2016/0219076 A1 | 7/2016 | Paczkowski et al. |
| 2016/0226791 A1 | 8/2016 | Ramamoorthy et al. |
| 2016/0248860 A1 | 8/2016 | Dunbar et al. |
| 2016/0249353 A1 | 8/2016 | Nakata et al. |
| 2016/0262044 A1 | 9/2016 | Calin et al. |
| 2016/0286043 A1 | 9/2016 | John et al. |
| 2016/0294732 A1 | 10/2016 | Chou et al. |
| 2016/0294734 A1 | 10/2016 | Jang et al. |
| 2016/0295614 A1 | 10/2016 | Lee et al. |
| 2016/0301566 A1 | 10/2016 | Ramasubramani et al. |
| 2016/0330140 A1 | 11/2016 | Cook et al. |
| 2016/0337180 A1 | 11/2016 | Rao |
| 2016/0352645 A1 | 12/2016 | Senarath et al. |
| 2016/0352924 A1 | 12/2016 | Senarath et al. |
| 2016/0353268 A1 | 12/2016 | Senarath et al. |
| 2016/0353422 A1 | 12/2016 | Vrzic et al. |
| 2016/0353465 A1 | 12/2016 | Vrzic et al. |
| 2016/0359682 A1 | 12/2016 | Senarath et al. |
| 2016/0373372 A1 | 12/2016 | Gillon et al. |
| 2016/0381146 A1 | 12/2016 | Zhang et al. |
| 2016/0381528 A1 | 12/2016 | Lee et al. |
| 2016/0381662 A1 | 12/2016 | Wang et al. |
| 2017/0005390 A1 | 1/2017 | Zakaria et al. |
| 2017/0026887 A1 | 1/2017 | Sirotkin et al. |
| 2017/0034761 A1 | 2/2017 | Narayanan |
| 2017/0054595 A1 | 2/2017 | Zhang et al. |
| 2017/0064591 A1 | 3/2017 | Padfield et al. |
| 2017/0064666 A1 | 3/2017 | Zhang |
| 2017/0070892 A1 | 3/2017 | Song et al. |
| 2017/0078183 A1 | 3/2017 | Civanlar et al. |
| 2017/0079059 A1 | 3/2017 | Li et al. |
| 2017/0085493 A1 | 3/2017 | Senarath et al. |
| 2017/0085501 A1* | 3/2017 | Utgikar ................... H04L 45/54 |
| 2017/0086049 A1 | 3/2017 | Vrzic |
| 2017/0086118 A1 | 3/2017 | Vrzic |
| 2017/0104609 A1 | 4/2017 | Mcnamee et al. |
| 2017/0104688 A1 | 4/2017 | Mirahsan et al. |
| 2017/0105144 A1 | 4/2017 | Strand et al. |
| 2017/0150399 A1 | 5/2017 | Kedalagudde et al. |
| 2017/0164419 A1 | 6/2017 | Kim |
| 2017/0195229 A1 | 7/2017 | Ulas et al. |
| 2017/0201922 A1 | 7/2017 | Akiyoshi |
| 2017/0208011 A1 | 7/2017 | Bosch et al. |
| 2017/0237667 A1* | 8/2017 | Wang .................... H04L 47/803 709/226 |
| 2017/0244598 A1 | 8/2017 | Crouse |
| 2017/0257276 A1* | 9/2017 | Chou ................. H04L 41/0896 |
| 2017/0272978 A1 | 9/2017 | Giloh et al. |
| 2017/0279672 A1 | 9/2017 | Krishnan et al. |
| 2017/0300350 A1 | 10/2017 | Ferris |
| 2017/0302369 A1 | 10/2017 | Kwoczek et al. |
| 2017/0303189 A1 | 10/2017 | Hampel et al. |
| 2017/0308407 A1 | 10/2017 | Vaishnavi |
| 2017/0329639 A1 | 11/2017 | Morper et al. |
| 2017/0339567 A1 | 11/2017 | Li et al. |
| 2017/0353494 A1 | 12/2017 | Krinos et al. |
| 2018/0070327 A1 | 3/2018 | Qureshi et al. |
| 2018/0077024 A1 | 3/2018 | Zhang |
| 2018/0084518 A1 | 3/2018 | Cattoni et al. |
| 2018/0098246 A1 | 4/2018 | Hoffmann |
| 2018/0123932 A1 | 5/2018 | Shaw et al. |
| 2018/0124254 A1 | 5/2018 | Shaw et al. |
| 2018/0124592 A1 | 5/2018 | Ye et al. |
| 2018/0131578 A1 | 5/2018 | Cui et al. |
| 2018/0139129 A1 | 5/2018 | Dowlatkhah et al. |
| 2018/0160311 A1 | 6/2018 | Shaw et al. |
| 2018/0184311 A1 | 6/2018 | Fiaschi et al. |
| 2018/0205640 A1 | 7/2018 | Zhang |
| 2018/0248953 A1 | 8/2018 | Shaw et al. |
| 2018/0254920 A1 | 9/2018 | Shaw et al. |
| 2018/0302316 A1 | 10/2018 | Ubaldi et al. |
| 2018/0316799 A1 | 11/2018 | Shaw et al. |
| 2018/0332476 A1 | 11/2018 | Shaw et al. |
| 2019/0007984 A1 | 1/2019 | Kuroda et al. |
| 2019/0090132 A1 | 3/2019 | Li et al. |
| 2019/0158676 A1 | 5/2019 | Shaw |
| 2019/0182328 A1 | 6/2019 | Shaw et al. |
| 2019/0191343 A1 | 6/2019 | Iwai et al. |
| 2019/0230228 A1 | 7/2019 | Shaw et al. |
| 2020/0014556 A1 | 1/2020 | Shaw et al. |
| 2020/0065474 A1 | 2/2020 | Dowlatkhah et al. |
| 2020/0244738 A1 | 7/2020 | Shaw et al. |
| 2020/0244812 A1 | 7/2020 | Shaw et al. |

FOREIGN PATENT DOCUMENTS

| | | |
|---|---|---|
| CN | 105516312 A | 4/2016 |
| CN | 105979542 A | 9/2016 |
| CN | 106257944 A | 12/2016 |
| JP | 5656803 B2 | 1/2015 |
| KR | 1473783 | 12/2014 |
| WO | 2000067449 | 11/2000 |
| WO | 2014071084 A2 | 5/2014 |
| WO | 2015198087 A1 | 12/2015 |
| WO | 2016051237 | 4/2016 |
| WO | 2016126238 A1 | 8/2016 |
| WO | 2016162467 A1 | 10/2016 |
| WO | 2016192639 A1 | 12/2016 |
| WO | 2017011827 A1 | 1/2017 |
| WO | 2017023196 | 2/2017 |
| WO | 2017044151 A1 | 3/2017 |
| WO | 2017044153 | 3/2017 |
| WO | 2017058067 | 4/2017 |

OTHER PUBLICATIONS

"Network Slicing", ericsson.com, Apr. 12, 2017, pp. 1-9.

"Network Slicing for 5G Networks and Services", 5G Americas™, 5gamericas.org, Nov. 2016, pp. 1-35.

"The Edge of the Cloud 5G Technology Blog", edgeofcloud.blogspot.com, TechBlogger, pen, Apr. 8, 2017, pp. 1-8.

Biral, Andrea et al., "The Challenges of M2M Massive Access in Wireless Cellular Networks", Department of Information Engineering of the University of Padova, Mar. 27, 2015, 1-19.

Bor-Yaliniz, et al., "The new frontier in RAN heterogeneity: Multi-tier drone-cells", 2016, 9 pages.

Datta, Soumya K. et al., "Smart M2M Gateway Based Architecture for M2M Device and Endpoint Management", Internet of Things (iThings), 2014 IEEE International Conference on, and Green Computing and Communications (GreenCom), IEEE and Cyber, Physical and Social Computing (CPSCom), IEEE. IEEE, 2014., 2014, 1-8.

Deak, Gabriel et al., "IoT (Internet of Things) and DFPL (Device-Free Passive Localisation) in a Disaster Management Scenario", Internet of Things (WF-IoT), 2015 IEEE 2nd World Forum on. IEEE, 2015., Aug. 2, 2012, 1-15.

Dhekne, et al., "Extending Cell Tower Coverage through Drones", 2017, 6 pages.

Ghavimi, Fayezeh et al., "M2M Communications in 3GPP LTE/LTE-A Networks: Architectures, Service Requirements, Challenges, and Applications", IEEE Communication Surveys & Tutorials, vol. 17, No. 2, Second Quarter 2015, May 9, 2015, 525-549.

Gramaglia, Marco et al., "Flexible connectivity and QoE/QoS management for 5G Networks: The 5G NORMA view", Communications Workshops (ICC), 2016 IEEE International Conference on. IEEE, 2016, pp. 1-7.

Le, Long B., "Enabling 5G Mobile Wireless Technologies", EURASIP Journal on Wireless Communications and Networking 2015.1 (2015): 218., 2015, 1-14.

(56) References Cited

OTHER PUBLICATIONS

McCullough, Don, "Why 5G Network Slices?", ericsson.com, Feb. 17, 2015, pp. 1-2.
Nikaein, Navid et al., "Network store: Exploring slicing in future 5g networks", Proceedings of the 10th International Workshop on Mobility in the Evolving Internet Architecture, ACM, 2015 pp. 1-6.
Novo, Oscar et al., "Capillary Networks—Bridging the Cellular and IoT Worlds", Internet of Things (WF-IoT), 2015 IEEE 2nd World Forum on. IEEE, 2015., 2015, 1-8.
Open Networking Foundation, "TR-526 Applying SDN Architecture to 5G Slicing", Issue 1, Apr. 2016, 1-19.
Podleski, Lukasz et al., "Multi-domain Software Defined Network: exploring possibilities in", TNC, 2014, pp. 1-7.
Sayadi, Bessem et al., "SDN for 5G Mobile Networks: NORMA perspective", International Conference on Cognitive Radio Oriented Wireless Networks. Springer International Publishing, 2016, pp. 1-12.

* cited by examiner

400

METHOD AND APPARATUS FOR DYNAMICALLY ADAPTING A SOFTWARE DEFINED NETWORK

CROSS REFERENCE TO RELATED APPLICATIONS

This application is a divisional of U.S. patent application Ser. No. 15/340,694 filed on Nov. 1, 2016. The contents of each of the foregoing is/are hereby incorporated by reference into this application as if set forth herein in full.

FIELD OF THE DISCLOSURE

The subject disclosure relates to a method and apparatus for dynamically adapting a software defined network.

BACKGROUND

There is an expanding ecosystem of devices people use to access applications and information, or interact with others, and monitor or control processes. This ecosystem goes well beyond desktop, laptop, and tablet computers to encompass the full range of endpoints with which humans might interact. Devices are increasingly connected to back-end systems through various networks, but often operate in isolation from one another. As technology evolves, we should expect connection models to expand, flow into one another and greater cooperative interaction between devices to emerge. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein.

DETAILED DESCRIPTION

Figure 1:
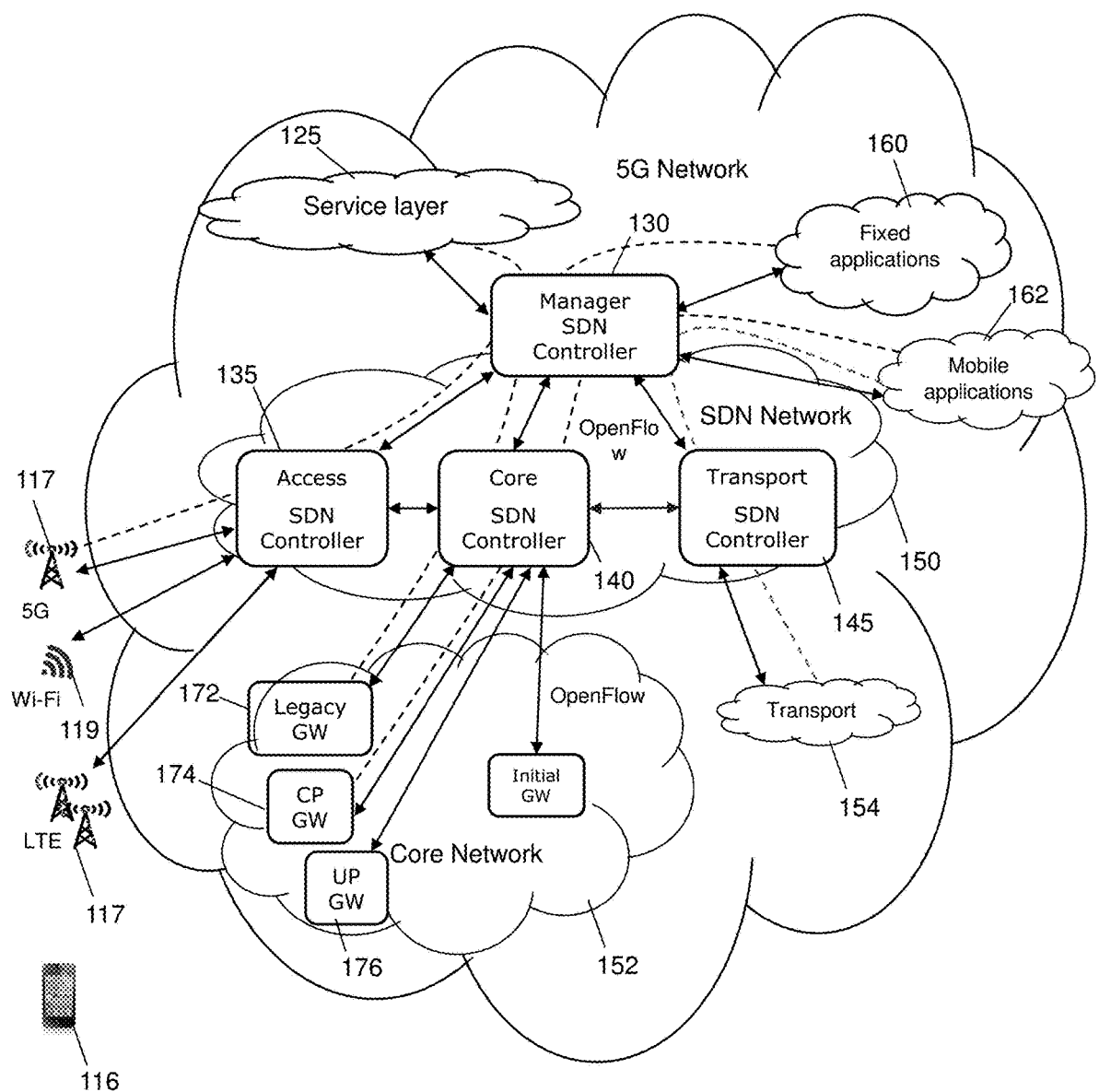
FIG. 1 depicts illustrative embodiments of an exemplary communication network for providing services to communication devices.

The subject disclosure describes, among other things, illustrative embodiments for adapting a communication network to provide services to communication devices. A Software Define Network (SDN) Management Controller can receive and processor requests for services. The Manager SDN Controller can determine, from a service layer and/or from past history, resources and/or requirements for providing the service. The Manager SDN Controller can compare these requirements to resources that are available from SDN Controllers that have been previously instantiated and configured by the Manager SDN Controller. If the previously instantiated SDN Controllers lack sufficient capability and/or capacity, then the Manager SDN Controller can instantiated additional SDN Controllers for providing these resources. The Manager SDN Controller operates at level 3, while the SDN Controllers direct control and data paths at level 2. The SDN Controllers also direct resources, including Network Function Virtualization (NFV) at the level 1. Other embodiments are described in the subject disclosure.

One or more aspects of the subject disclosure include a machine-readable storage medium, including executable instructions that, when executed by a processing system including a processor, facilitate performance of operations, including receiving a first service request via a network. The operations can also include transmitting a query to service layer equipment according to the first service request that is received and, in turn, receiving, from the service layer equipment, a first plurality of service requirements to fulfill the first service request responsive to the query that is transmitted. The operations can also include determining a first plurality of software defined network controllers according to the first plurality of service requirements. The operations can include determining a first plurality of priorities for the first plurality of software defined network controllers according to the first plurality of service requirements. The operations can also include instantiating into the network the first plurality of software defined network controllers that are configured according to the first plurality of priorities to fulfill the first service request. The operations can include receiving a first communication from a first software defined network controller of the first plurality of software defined network controllers that are instantiated. The operations can further include determining a shortage in a first network resource according to the first communication and, in turn, transmitting a second communication to the first software defined network controller of the first plurality of software defined network controllers to direct the first software defined network controller to instantiate a first virtual network function to compensate for the shortage in the first network resource.

One or more aspects of the subject disclosure include a software defined network manager, comprising a processing system including a processor and a memory that stores executable instructions that, when executed by the processing system, facilitate performance of operations, including receiving a first service request via a network and, in turn, transmitting a query to service layer equipment according to the first service request that is received. The operations can include receiving, from the service layer equipment, a first plurality of service requirements to fulfill the first service request responsive to the query that is transmitted. The operations can further include transmitting, responsive to receiving the first plurality of service requirements, a request for network resource capacity information to a second plurality of software defined network controllers that are previously instantiated. The operations can also include receiving network capacity information from a second plurality of software defined network controllers. The operations can include determining a first plurality of software defined network controllers according to the first plurality of service requirements and to the network capacity information of the second plurality of software defined network controllers. The operations can also include instantiating into the network the first plurality of software defined network controllers to fulfill the first service request. The first plurality of service requirements can be met, in part, by the first plurality of software defined network controllers that are instantiated and, in part, by the second plurality of software defined network controllers.

One or more aspects of the subject disclosure include a method including receiving, from service layer equipment of a network and by a processing system including a processor, a first plurality of service requirements to fulfill a first service request. The method can include determining, by the processing system, a first configuration of a first plurality of software defined network controllers according to the first plurality of service requirements. The method can also include instantiating, by the processing system, into the network the first plurality of software defined network controllers according to the first configuration to fulfill the first service request. The method can further include receiving, by the processing system, a first communication from a first software defined network controller of the first plurality of software defined network controllers that are instantiated. The method can include determining, by the processing system, a shortage in a first network resource according to the first communication. The method can also include transmitting, by the processing system, a second communication to the first software defined network controller of the first plurality of software defined network controllers to direct the first software defined network controller to instantiate a first virtual network function to compensate for the shortage in the first network resource.

In a communication network, communication services are typically provided by vendor equipment, which is custom made and/or configured during installation to provide functions necessary for providing desired services. When changes are made to the network, service instantiation and management can require substantial labor to accommodate and/or incorporate new equipment, which may result delayed service instantiation and a system that demonstrates poor dynamic response to changes in network demand In addition, network flows are generally controlled by a control plane that is associated with the vendor equipment. However, the control plane is often integrated with the data or user plane such that changes to a network element may require re-definition or reconfiguration of a service.

Operation support systems ("OSS") can currently be used to create and/or configure services. However, the process for determining system needs and instantiating equipment can be slow (non-dynamic) and labor intensive, where the service is defined and specified, configured for a chosen vendor network element, coded into a software architecture, and tested.

Some communication network providers are turning to Software Design Network (SDN) solutions to improve network flexibility and change dynamics. For example, network providers may use a SDN controller for provisioning resource and capacity for a mobility core network. However, in these configurations, the core network is a fixed asset within the communication network. SDN controller provisioning can alter performance or control plane assignment of mobility core network components but does not create a fully distributed and dynamically responsive system nor a system that can predict and provide capacity and resource requirements.

Referring now to FIG. 1, illustrative embodiments of an exemplary communication network for providing services to communication devices is shown. In one or more embodiments, a communications system 100 can be controlled by a Software Defined Network (SDN) Manager Controller 130. The Manager SDN Controller 130 can be provided by a computing system executing computer-executable instructions and/or modules to provide various functions. In one or more embodiments, multiple computer systems or processors can provide the functionality illustrated and described herein with respect to the Manager SDN Controller 130. To simplify the description of the concepts and technologies described herein, the Manager SDN Controller 130 is illustrated and described herein as being provided by a single computing system. However, it should be understood that this example is illustrative and therefore should not be construed as being limiting in any way.

In one or more embodiments, the Manager SDN Controller 130 can include various components and/or can be provided via cooperation of various network devices or components. For example, the Manager SDN Controller 130 can include or have access various network components or resources, such as a network resource controller, network resource autonomous controller, a service resource controller, a service control interpreter, adapters, application programming interfaces, compilers, a network data collection and/or analytics engine. The Manager SDN Controller 130 also can include or access information describing available resources and network information, such as network object statistics, events or alarms, topology, state changes. In one or more embodiment, the Manager SDN Controller 130 can use and/or can generate and/or access system configurations, including configurations of resources available to the Manager SDN Controller 130 for proving access to services.

In one or more embodiments, the communication system 100 can include a Service Layer 125. The Service Layer 125 can provide access to third-party services and applications at a higher application layer. The Service Layer 125 may include capability servers, owned by the operator of the communication network 100, that can access and provide access to application layer servers owned by third-party content providers via open and secure Application Programming Interfaces (APIs). The Service Layer 125 can also provide an interface to a Core Network 152. The communication network 100 can also include access to Applications, such as Fixed Applications 160 and Mobile Applications 162.

In one or more embodiments, the communication network 100 can include an SDN Network 150. The SDN Network 150 can include multiple SDN Controllers 130, 135, 140 and 145. The SDN Controllers 130, 135, 140 and 145 can provide different types of functions and can be arranged in virtual layers. For example, the SDN Network 150 can include a Manager SDN Controller 130 that controls and coordinates functioning of the SDN Network 150. The Manager SDN Controller 130 can be a top-level Management System in the architecture. Below the Manager SDN Controller 130, a next level of SDN Controllers 135, 140 and 145 can be instantiated and configured by the Manager SDN Controller 130 to provide specific classes of functionality in the architecture. For example, the Manager SDN Controller 130 can provide level 3 functionality to control and coordinate service control, configuration, and data flow in the communication network 100. The Manager SDN Controller 130 can, as needed, instantiate, configure, and direct level 2 SDN Controllers 135, 140 and 145 for controlling Access, Core, and Transport capabilities in the communication network 100.

In one or more embodiments, the Manager SDN Controller 130 can allow the communication network 100 to separate control plane operations from a data plane operations. The Manager SDN Controller 130 can also enable layer abstraction for separating service and network functions or elements from physical network functions or elements. In one or more embodiments, the Manager SDN Controller 130 can coordinated networking and provision of applications and/or services. The Manager SDN Controller 130 can manage transport functions for various layers within the communication network and access to application functions for layers above the communication network. The Manager SDN Controller 130 can provide a platform for network services, network control of service instantiation and management, as well as a programmable environment for resource and traffic management. The Manager SDN Controller 130 also can permit a combination of real time data from the service and network elements with real-time or near real-time control of a forwarding plane. In various embodiments, the Manager SDN Controller 130 can enable flow set up in real-time, network programmability, extensibility, standard interfaces, and/or multi-vendor support. In one embodiment, interactions between layers of the communication network 100 can be based upon policies to determine optimum configuration and rapid adaptation of the network 100 to changing state and changing customer requirements for example, predicted demand, addition of new users, spikes in traffic, planned and unplanned network outages, adding new services, and/or maintenance.

In one or more embodiments, the Manager SDN Controller 130 can support legacy and emerging protocols through the use of adapters, including, but not necessarily limited to, configurator or adapters that can write to the network elements, and listening adapters that can collect statistics and alarms for the data collection and analytic engine as well as for fault and performance management. Modularity of the Manager SDN Controller 130 can allow the enable functions, such as compiling, service control, network control, and data collection and analytics to be optimized and developed independently of the specific vendor network equipment being controlled.

In one or more embodiments, the Manager SDN Controller 130 can enable separation of service control from network resource control. This separation can enable abstraction of service definitions from particular types of network resources that are selected and used for implementation of services. For example, a service can be defined by the Manager SDN Controller 130 independently of actual network layer and vendor specifics. Access service features can be separated from flow service features and can thereby connect to different types of flow services quickly. In one embodiment, customers can access services over a connection that can be added, removed, evolved, combined, or otherwise modified and that may no longer be tied to the service. In one or more embodiments, the Manager SDN Controller 130 can creation of a set of saved configurations, templates, and/or building blocks for creating and providing a service. A customer can pick an access path (e.g., DSL, Broadband, Private Line, IP, VPN, etc.) that is independent of a service that has been selected. In one embodiment, this approach can provide several benefits such as, for example, more rapid instantiation of network elements and addition of new services, matching network features, performance, and capabilities to customer needs on-demand, and allocation of network resources for an individual customer while maintaining network and operational efficiencies.

In one or more embodiments, the Manager SDN Controller 130 can instantiate a virtualized environment including compute, storage, and data center networking for virtual applications. The Manager SDN Controller 130 can direct on-demand instantiation of network elements at on-demand locations to support network services for a customer or for the autonomous network resource controller where capacity is needed or where backup of network elements due to failures. Service functions can be moved and/or changed in response to traffic flow rather than traffic flow moving to the desired service functions.

In one or more embodiments, the Manager SDN Controller 130 can cooperate with a cloud orchestrator in instantiating SDN Controllers 135-145 and network services to support the network configuration in connecting Virtual Machined (VMs) that the cloud orchestrator is setting up. The network instantiation and configuration can include configuration of the virtual networks, which may operate at various physical levels in a cloud server architecture, including hypervisor, top of rack, cloud network fabric, and/or IP provider edge, which can connect the cloud network with the service provider WAN network.

In one or more embodiments, the Manager SDN Controller 130 can be configured to access information describing models of services that can be provided to communication devices. Formal data models and/or templates can be inputs into the network resource controller, which can compile and create the actual steps necessary to configure the vendor specific network elements. The formal information data or models can enable separation of service definitions from vendor specific implementations. In one or more embodiments, the Manager SDN Controller 130 can use service and networking templates stored at or accessible to the Manager SDN Controller 130 and assemble a service from the templates. The Manager SDN Controller 130 can also translate information data and/or models describing services into programmable logic modules, where a programmable logic language can be used to define service and network templates. These templates can be matched to the desired service features, the matched templates can be assembled by the Manager SDN Controller 130. The template-based service representation can be compiled by the software defined network controller, and the compiled template-based service representation can be validated using emulated field test environments to validate the service. After validation, the service can be ready for instantiation on the network and the Manager SDN Controller 130 can interact with network elements to deploy the service and/or can issue commands to effect the deployment.

In one or more embodiments, a communication device 116 can operate in communication with and/or as a part of a communications network 100. The functionality of the communication device 116 may be provided by one or more server computers, desktop computers, mobile telephones, smartphones, laptop computers, set-top boxes, other computing systems, and the like. It should be understood that the functionality of the communication device 116 can be provided by a single device, by two similar devices, and/or by two or more dissimilar devices. For purposes of describing the concepts and technologies disclosed herein, the communication device 116 is described herein as a workstation or personal computer. It should be understood that this embodiment is illustrative, and should not be construed as being limiting in any way.

The communication device 116 can execute an operating system and one or more application programs. The operating system can be a computer program that controls the operation of the communication device 116. The application programs can be executable programs that are configured to execute on top of the operating system to provide various functions. According to various embodiments, the application programs can include web browsers, productivity software, messaging applications, combinations thereof, or the like. In one or more embodiments, the application programs of the communication device 116 can include applications that enable interactions between the communication device 116 and other devices or entities. In some contemplated embodiments, the application programs can provide functionality for interacting with and/or communicating with the communication network 100 and, in turn, having communications analyzed by Manager SDN Controller 130.

According to various embodiments, the Manager SDN Controller 130 can include and/or access resources, such as a service orchestrator, a software defined network controller, a cloud orchestrator 116, and/or other elements. It should be understood that the Manager SDN Controller 130, and any of the above-described components, or combinations thereof, may be embodied as or in stand-alone devices or components thereof operating as part of or in communication with the communication network 100. As such, the illustrated embodiment should be understood as being illustrative of only some contemplated embodiments and should not be construed as being limiting in any way.

In one or more embodiments, the Manager SDN Controller 130 can enable a shortened service conception-to-deployment timeline, as well as enabling improved service management functionality. In particular, the Manager SDN Controller 130 can receive or obtain the service request from the communication device 116 or from any other requesting source. According to various embodiments, the service request can be received as a request to order. In one embodiment, the service request can be in the form of a programming language file, which can be written in various languages and/or can include various types of models or the like. In some contemplated embodiments, the service request is provided by one or more Yang files, one or more XML files, one or more hypertext markup language ("HTML") files, one or more scripts and/or programming language files, files in other languages or formats, combinations thereof, or the like.

In one or more embodiments, the Manager SDN Controller 130 can automatically evaluate application service requirements that have been requested from the communication system 100. In one embodiment, a service request can be received from a customer or customer device. For example, a request can be receive via a portal. The service request can be provided to the soft Manager SDN Controller 130 for service creation, instantiation, and management. According to various embodiments, the service request can be analyzed by the Manager SDN Controller 130. In one embodiment, the Manager SDN Controller 130 can access or query the Service Layer 125 to determine service requirements needed for fulfilling the service request.

In one or more embodiments, a service request can be received by a customer (e.g., via the portal), and provided to the software defined network controller for service creation, instantiation, and management. The service request can include application objects and/or requests for particular services or functions. Thus, the service request can include objects that define service functions that are desired, requests for generation of services and/or requests for particular functionality, queries, combinations thereof, or the like. It should be understood that these examples are illustrative and therefore should not be construed as being limiting in any way. According to various embodiments, the service request can be analyzed by the software defined network controller and a set composed of a directed graph and the associated model or model files are selected. The model can define features of the service and can generate in a programming language or format such as XML, Yang models, other types of files, combinations thereof, or the like. The selected directed graph can be used at runtime to fill in the event-specific details from the application programming interface ("API"), the resource allocations per the directed graph and the resource model, and one or more state changes in the network through the adapters.

In one or more embodiments, the Manager SDN Controller 130 can include, expose, and/or communicate with a portal 120. The functionality of the portal 120 can be provided, in various embodiments, by an application hosted and/or executed by a computing device such as a server computer, a web server, a personal computer, or the like. In some other embodiments, the functionality of the portal can be provided by a module or application hosted or executed by one or more computing devices. Thus, it can be appreciated that the functionality of the portal can be provided by a hardware or software module executed by one or more devices that provide the software defined network framework and/or by other devices. Because the portal can be provided in additional and/or alternative ways, it should be understood that these examples are illustrative and therefore should not be construed as being limiting in any way.

In one or more embodiments, the communication device 116 can communicate with the communication network 100 via a wireless communication link. For example, the communication device 116 can be a mobile communication device 116 that communications via a cellular communication link through a Radio Access Network (RAN) technology. A mobility network 117, such as an LTE network or a 5G network can establish wireless communications with the communication device 116, where the communication device 116 can move from cell to cell while maintaining a communication session. In another example, the communication device 116 can communication with the communication network via a WiFi network 119 link. The WiFi network 119 can be, for example, a local area network (LAN) that is supported by a router capable of wireless communications or can be an individual device, such another mobile communication device 116 capable of acting as an intermediary (e.g., a Hot Spot). In one or more embodiments, the communication network 100 can be a converged network capable of supporting a wide range of access, core and transport networks, such as wireline, wireless, satellite, 3GGP, non-3GPP, and/or 5G.

In one or more embodiments, the communication device 116 can establish a session with a portal. The portal can be a function of an application that is resident at the communication device 116 as a stand-alone application or as a client application to a server application of the network 100 or a third party. The portal functionality enables the communication device 116 to define or request particular service features either directly or indirectly. According to various embodiments, the communication device 116 can provide to the portal, or can define via the portal, a service request. In one or more embodiments, the service request can include service feature data that represents service features desired or needed in a service being created and/or instantiated via the Manager SDN Controller 130. Alternatively, the service request can be a bare request for access to a service. In this case, the Manager SDN Controller 130 can determine the nature of the service and the functionality/resources required for providing the service.

In one or more embodiments, the Manager SDN Controller 130 can query the Service Layer 125 to determine the functional and/or resource requirements to provide the service to the communication device 116. In one or more embodiments, the service requirements can include service feature data. In one or more embodiments, this service feature data can be generated by or provided to the Service Layer 125 and/or the Manager SDN Controller 130 via interactions between the communication device 116 and the portal. For example, in the process of making the service request, the communication device 116 can make a series of selections from menus, drop-down lists, fields, tables, or other data or object selection mechanisms that may be provided by the portal and/or the application programs executing on the communication device 116. In some embodiments, the application programs can include a web browser application or other application that can obtain data from the portal. In one or more embodiments, the application programs can use the data to generate and present a user interface at the communication device 116. The user interface can include possible service features, and a user or other entity can select the desired features, drag and drop desired features, and/or otherwise indicate desired features in a service.

In one or more embodiments, regardless of the specific technique for capturing and/or deriving service features, using interactions between the communication device 116 and the portal, and the service feature data can represent feature choices or definitions made. In one embodiment, the portal can be configured to obtain the service feature data and to generate and/or output the service data as a programming file or in a programming file format. In one embodiment, the portal can be supported or directed by the Manager SDN Controller 130. It should be understood that these examples are illustrative and therefore should not be construed as being limiting in any way.

In one or more embodiments, the Manager SDN Controller 130 can analyze the service data or information and identify service features indicated by and/or associated with the requested service. Based upon the service request and/or service data, the Manager SDN Controller 130 can identify one or more service features associated with a service. As used herein, a "service feature" can be used to refer to an operation, a set of operations, a process, a method, a combination thereof, or the like associated with a service. Thus, for example, if the service provides the ability to check an email service for new messages, the feature identified by the Manager SDN Controller 130 can correspond to checking for new email messages. It therefore can be appreciated that any function, functionality, set or subset of functions or functionality, processes or set of processes, method flows, work flows, combinations thereof, or the like can correspond to a service feature. As such, the above example should be understood as being illustrative of one example feature and therefore should not be construed as being limiting in any way.

In one or more embodiments, the Manager SDN Controller 130 can analyze the service request and/or other implementation of the service data to identify each of one or more features associated with the requested service. The identification of service features can be iterated by the Manager SDN Controller 130 until each feature is identified. Upon determining that additional features associated with the service do not remain, the Manager SDN Controller 130 can generate and select a service model, template, and/or program that represents the requested service. In one embodiment, the Manager SDN Controller 130 can receive a service model.

In one or more embodiments, the Manager SDN Controller 130 can analyze policies or policy defined for a service. This policy can include network engineering rules, which can be defined by a network designer, engineer, business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

In one or more embodiments, the Manager SDN Controller 130 can determine from the service model one or more physical network functions or other resources that will be needed or used to support the service. The Manager SDN Controller 130 also can analyze the service model to identify one or more virtual network functions or other functions that will support or provide the features of the service. The Manager SDN Controller 130 also can determine, via analysis of the service model, process flows between the various resources and/or functions used to support or provide the service features.

In one or more embodiments, the Manager SDN Controller 130 can select service and networking templates stored at or accessible to the Manager SDN Controller 130. Features requested in the service request can be matched to the templates, and the Manager SDN Controller 130 can assemble a service from the templates. In one embodiment, the Manager SDN Controller 130 can compile the assembled templates and with a real time network map, create a directed graph that can configure the network elements based on a specific sequence defined by the directed graph. Upon successful validation, the Manager SDN Controller 130 can interact with network elements such as a service orchestrator and a cloud orchestrator to instantiate resources for performing functions, including computing, storage, and local networking in a virtual environment, and to instantiate the service. In one or more embodiments, the Manager SDN Controller 130 can configure physical and virtual network functions and a cloud orchestrator can instantiate the virtual network functions (e.g., virtual machines ("VMs")). After virtual network function instantiation, the Manager SDN Controller 130 can configure, monitor, and manage the service. In one or more embodiments, the Manager SDN Controller 130 can receive or get events from the network and trigger a directed graph to execute the logic of the intended service, feature, or flow.

In one or more embodiments, the Manager SDN Controller 130 can automatically prioritize and instantiate the next lower level (e.g., level 2) SDN controller including an Access Network SDN Controller 135, a Core Network SDN Controller 140, and/or a Transport Network SDN Controller 140 on the fly. Generally, the Manager SDN Controller 130 can instantiating at least one set of these level 2 SDN Controllers 135-145 to provide baseline functionality and connectivity for a least one communication device 116. As server requests are processed, the Manager SDN Controller 130 can evaluate the service request requirements (i.e., the service features) and compare the required resources and capacities for these resources with the resources and capacities currently available at the SDN network 150 via the level 2 SDN Controllers 135-145. In one embodiment, the Manager SDN Controller 130 can communicate with each of the instantiated SDN controllers via a communication interface, such as an OpenFlow interface. In addition, the SDN Controllers 135-145 of level 2 to can communicate among themselves to determine resource capabilities, capacities, shortages, failures, and/or warnings. In one or more embodiments, if the Manager SDN Controller 130 determines that the requested service can be performed, within system margins, using the currently instantiated SDN Controllers 135-145, then the Manager SDN Controller 130 can decide to direct the SDN Controllers 135-145 to perform the service for the communication device 116. Alternatively, if the Manager SDN Controller 130 determines a shortage or shortfall in a needed resource, then the Manager SDN Controller 130 can direct instantiation of one or more new SDN Controller 135-145 for performing all or part of the requested service. For example, the Manager SDN Controller 130 may determine that the service request associated with the communication device 116 or many communication devices 116 or merely received at the communication network 110 from an indeterminate device (e.g., a request for resources from another network) requires additional Core SDN Controller capacity 140. In this case, the Manager SDN Controller 130 can direct the instantiation of additional Core SDN Controller 140 capacity from a set of configurable SDN Controller devices at the cloud.

In one or more embodiments, level 2 SDN Controllers 135-145, including Access SDN Controller 135, Core SDN Controller 140, and Transport SDN Controller 145 can control devices at level 1 of the communication network 100. For example, the Access SDN Controller 135 can control, direct, configure, and monitor Access Resources 117 and 119 for the network 100, such as eNodeB controllers, RAN controllers, and or WiFi controllers. In another example, the Core SDN Controller 140 can control, direct, configure, and monitor Core Resources 172-178 for the Core Network 152 of the communication network 100, such as Gateways (GW) for Control Plane (CP) 174, User Plane (UP) 176, Legacy (i.e., combined user and control plane) 172. In another example, the Transport SDN Controller can control, direct, configure, and monitor Transport Layer services 154, such as a Multiprotocol Label Switching (MPLS) network, Fiber Optics network, and/or a Backbone network.

In one or more embodiments, the Manager SDN Controller 130 can manage one or more sets of SDN Controllers 135-145 in the SDN Network 150. The Manager SDN Controller 130 can configure and/or reconfigure the instantiated SDN Controllers 135-145 to optimize the SDN Network 150 according to loading created by the service requests. For example, the Manager SDN Controller 130 can invention automatically instantiate multiple levels of fully distributed SDN Controllers 135-145. The Manager SDN Controller 130 can support instantiation "on the fly" base on new requests, the ending of old requests, monitoring network traffic, and/or requesting loading information from the SDN Controllers 135-145. The Manager SDN Controller 130 can instantiate and/or decommission SDN Controllers into and out from the SDN Network 150 on an on-going basis according to the exchange-to-exchange (E2E) application service requirements. For example, in a streaming media application, such as a Netflix™ Video Delivery application, the Manager SDN Controller 130 can determine that network demands for the Access SDN Controller 135 and Transport SDN Controller 145 may be relatively large for a given set of communication devices 116, while the Core SDN Controller 140 demands for these communication devices 116 may be relatively normal. The Manager SDN Controller 130 can look at the available resources and capacities for the currently instantiated SDN Controllers 135-145 that are support these communication devices 116. If the demands of the media streaming application exceed the available resources, then the Manager SDN Controller 130 can automatically address the issue by, for example, instantiating additional Access SDN Controller 135 and Transport SDN Controller 145 resources.

In one or more embodiments, the Manager SDN Controller 130 may determine that sufficient resources exist at the currently instantiated Access SDN Controller 135 and Transport SDN Controller 145 resources, however, the priorities of these resources need to be adjusted. For example, where a heavy streaming media loading is identified, the Access SDN Controller 135 and Transport SDN Controller 145 resources may be given higher priority in comparison to the Core SDN Controller 140. Conversely, if a heavy loading of Voice over IP (VoIP) services is identified, then the Manager SDN Controller 130 can automatically place the Core Network SDN Controller 140 into higher priority in comparison to Access Network SDN Controller 135 and Transport Network SDN Controller 145.

In one or more embodiments, the Manager SDN Controller 130 can decide how to use network resources to fulfill the data needs. The Manager SDN Controller 130 can communicate, directly, with the SDN Controllers 135-145 on level 2 (e.g., via Open Flow) and indirectly with the Network Function Virtualization resources on the level 1.

In one or more embodiments, the Manager SDN Controller 130 can access service level information associated with the communication devices 116. The Manager SDN Controller 130 can determine if the communication device 116 is associated with a premium service level, for example, and can instantiate additional resources and/or adjust priority levels of currently instantiated resources to provide requested services according to Quality of Service (QoS) levels associated with the service level.

In one or more embodiments, the Manager SDN Controller 130 can access historical information or prospective information to predict resources that may be needed at a time in the future. For example, the Manager SDN Controller 130 can access historical resource demand information associated with the network 100 and/or a particular part of the network. For example, the Manager SDN Controller 130 can determine that the demand for streaming media resources is likely to be very high on a particular day of the week, because historical data indicates that this day is a popular day of the week for streaming data. In another example, the Manager SDN Controller 130 can make this type of predictive determination for a particular communication device 116 or set of devices 116 based on historical data. In another example, the Manager SDN Controller 130 can access a database with information on triggers that correspond to increased or decreased levels of usage (above or below mean usage). For example, the database may include information on a release of a several season of a popular program for access via streaming media. The data may further indicate a high probability for massive streaming of data associated with this program beginning at a certain time. By analyzing and responding to these indicators of out-of-typical usage, the Manager SDN Controller 130 can instantiate additional resources or, if warranted, decommission resources (or reassign to other uses).

In one or more embodiments, the Manager SDN Controller 130 can store models, templates, programs, and/or configurations associated with providing services to communication devices via the communication network 100. For example, if a communication device 116 includes a High Definition camera devices, and if the user off the communication device 116 decides to upload data from the High Definition camera function to, for example, a cloud-based storage location accessible via the communication network, then the Manager SDN Controller 130 can determine the needed resources and priority settings. Based on the setup, and optionally, on analysis of the performance of the system during the upload of the data, the Manager SDN Controller 130 can determine that the entire setup should be saved for later use.

In one or more embodiments, the Manager SDN Controller 130 can receive real time feedback from network resources during operation. For example, the Manager SDN Controller 130 can receive information from the SDN Controllers 135-145 of the level 2. Alternatively, the Manager SDN Controller 130 can receive information, indirectly, from the level 1 resources and VFN devices. The Manager SDN Controller 130 can use the feedback information to determine the status of the resources that have been assigned by the Manager SDN Controller 130 to provide services. The Manager SDN Controller 130 can determine, for example, that insufficient resources have been instantiated and/or prioritized for a task or for one or more communication devices 116. The Manager SDN Controller 130 can then direct the instantiation of additional SDN Controllers 135-145 and/or alteration in configuration and/or priority of SDN Controllers 135-145. Conversely, the Manager SDN Controller 130 can determine that too many resources have been dedicated and decide to either decommission and/or reassign the resources to thereby provide on-the-fly and dynamic response.

In one or more embodiments, each of the Level 2 SDN Controllers 135-145 can instantiate required VNFs on-the-fly, in order to fulfill E2E service delivery. In one or more embodiments, rather than leveraging a single level SDN Controller, many SDN Controllers 130 and 135-145 can be used to achieve multiple levels of SDN control and management.

Figure 2:
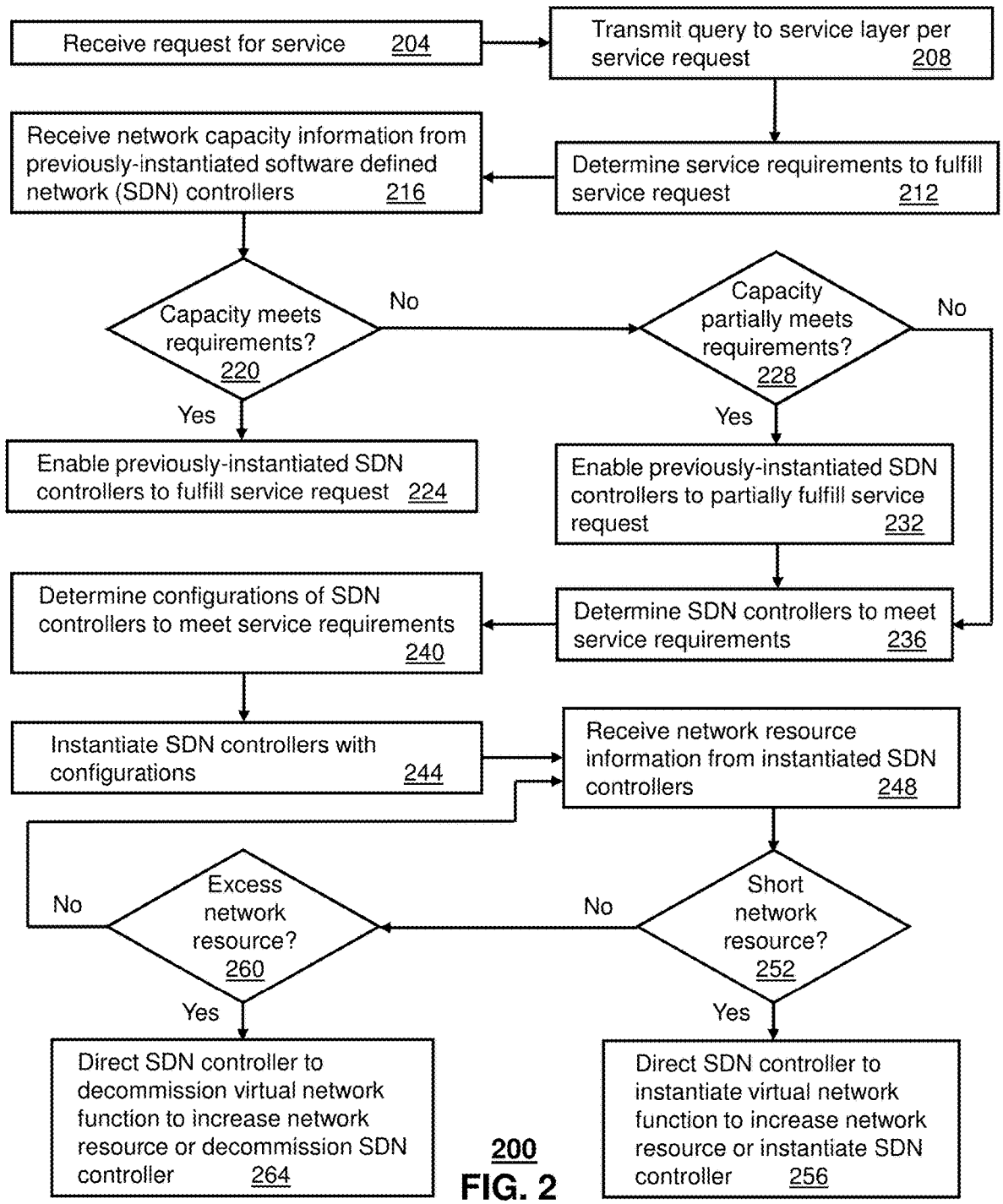
FIG. 2 depicts an illustrative embodiment of a method used in portions of the systems described in FIG. 1.

FIG. 2 depicts an illustrative embodiment of a method used in portions of the systems described in FIG. 1 for adapting a communication network to provide services to communication devices. In step 204, a Software Define Network (SDN) Management Controller can receive requests for services. In step 208, the Manager SDN Controller can query a Service Layer according to the service request. The Manager SDN Controller can determine, from a service layer and/or from past history, resources and/or requirements for providing the service in step 212.

In step 216, the Manager SDN Controller can compare these requirements to resources that are available from SDN Controllers that have been previously instantiated and configured by the Manager SDN Controller. In step 220, if the previously instantiated SDN Controllers have sufficient capability and/or capacity, then the Manager SDN Controller can enable the previously-instantiated SDN Controller to fulfill the service request in step 224. If the Manager SDN Controller determines that the previously instantiated SDN Controllers can perform part of the service requirements in step 228, the Manager SDN Controller can enable the previously instantiated SDN Controllers to perform part of the service requirements in step 232. The Manager SDN Controller can determine new SDN Controllers to meet the service requirements in step 236 and can determine configurations, such as priorities, for these new SDN Controllers in step 240.

In step 244, the Manager SDN Controller can instantiate and configure additional SDN Controllers that are needed to perform the service requirements. In step 248, the Manager SDN Controller can receive network resource information from the instantiated SDN Controllers. In step 252 the Manager SDN Controller can determine if the current set of instantiated SDN Controllers are short on network resources. If so, then the Manager SDN Controller can direct one or more SDN Controllers to instantiate one or more Virtual Network Functions (VNF) to increase the network resource. Alternative, the Manager SDN Controller can instantiate additional SDN Controllers. In step 260 the Manager SDN Controller can determine if the current set of instantiated SDN Controllers have excess network resources. If so, then the Manager SDN Controller can direct one or more SDN Controllers to decommission one or more Virtual Network Functions (VNF) to reduce the network resource. Alternative, the Manager SDN Controller can decommission one or more SDN Controllers.

Figure 3:
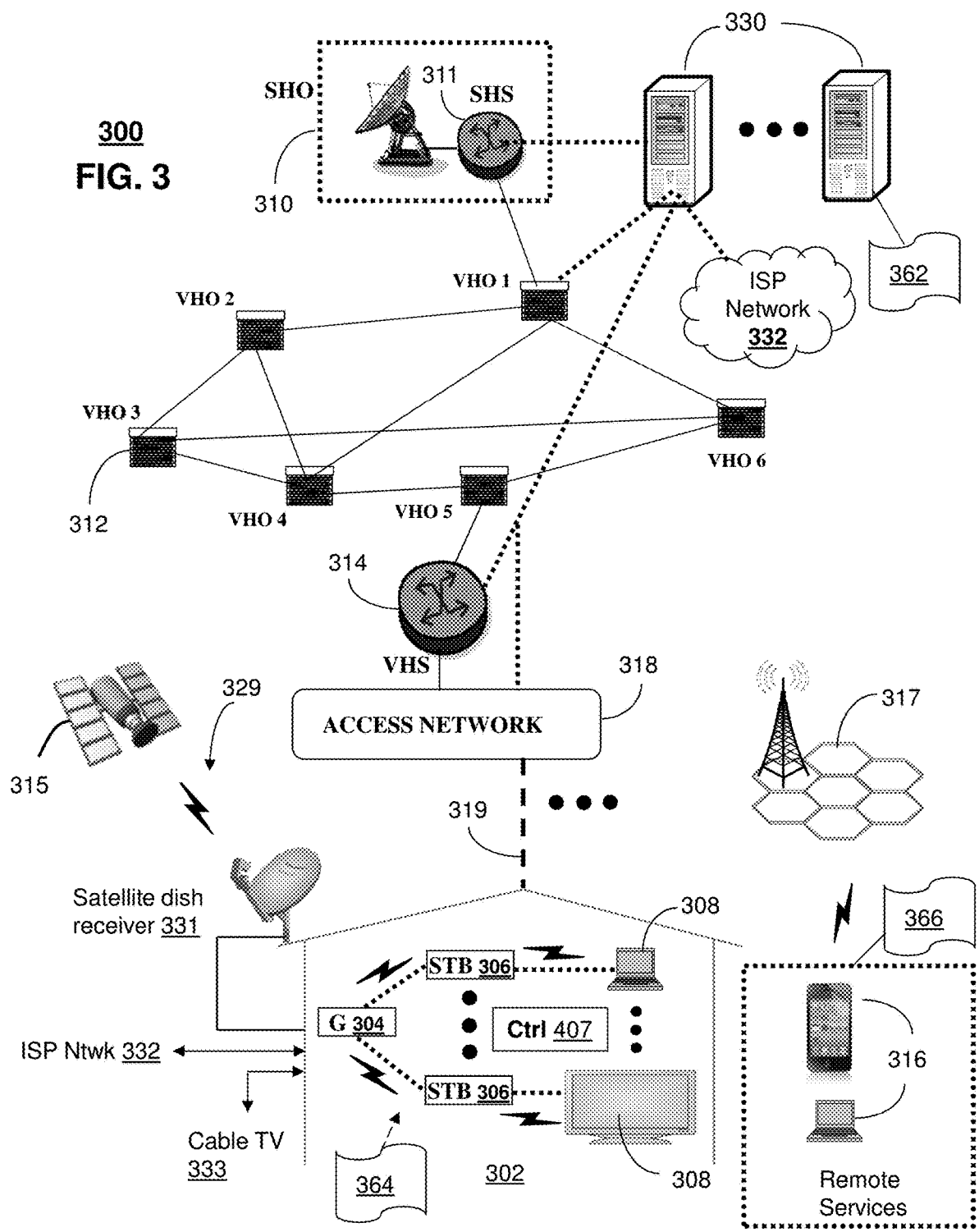
FIGS. 3-4 depict illustrative embodiments of communication systems that provide media services that can be used by the communication network of FIG. 1.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 3 depicts an illustrative embodiment of a communication system 300 for providing various communication services, such as delivering media content. The communication system 300 can represent an interactive media network, such as an interactive television system (e.g., an Internet Protocol Television (IPTV) media system). Communication system 300 can be overlaid or operably coupled with system 100 of FIG. 1 as another representative embodiment of communication system 100. For instance, one or more devices illustrated in the communication system 300 of FIG. 3 for adapting a communication network to provide services to communication devices. A Software Define Network (SDN) Management Controller can receive and processor requests for services. The Manager SDN Controller can determine, from a service layer and/or from past history, resource and/or requirement for providing the service. The Manager SDN Controller can compare these requirements to resources that are available from SDN Controllers that have been previously instantiated and configured by the Manager SDN Controller. If the previously instantiated SDN Controllers lake sufficient capability and/or capacity, then the Manager SDN Controller can instantiated additional SDN Controllers for providing these resources.

In one or more embodiments, the communication system 300 can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol. The VHS 314 can distribute multimedia broadcast content via an access network 318 to commercial and/or residential buildings 302 housing a gateway 304 (such as a residential or commercial gateway).

The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (WiFi), Bluetooth®, Zigbee or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 302. Modulated signals received by the satellite dish receiver 331 can be transferred to the media processors 306 for demodulating, decoding, encoding, and/or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. System 300 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media devices 308 or wireless communication devices 316.

Communication system 300 can also provide for all or a portion of the computing devices 330 to function as a Manager SDN Controller. The Manager SDN Controller 330 can use computing and communication technology to perform function 362, which can include among other things, the communication network adaptation techniques described by method 200 of FIG. 2. For instance, function 362 of Manager SDN Controller 330 can be similar to the functions described for Manager SDN Controller of FIG. 1 in accordance with method 200. The media processors 306 and wireless communication devices 316 can be provisioned with software functions 364 and 366, respectively, to utilize the services of Manager SDN Controller 330. For instance, functions 364 and 366 of media processors 306 and wireless communication devices 316 can be similar to the functions described for the communication devices 116 of FIG. 1 in accordance with method 200.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 4:
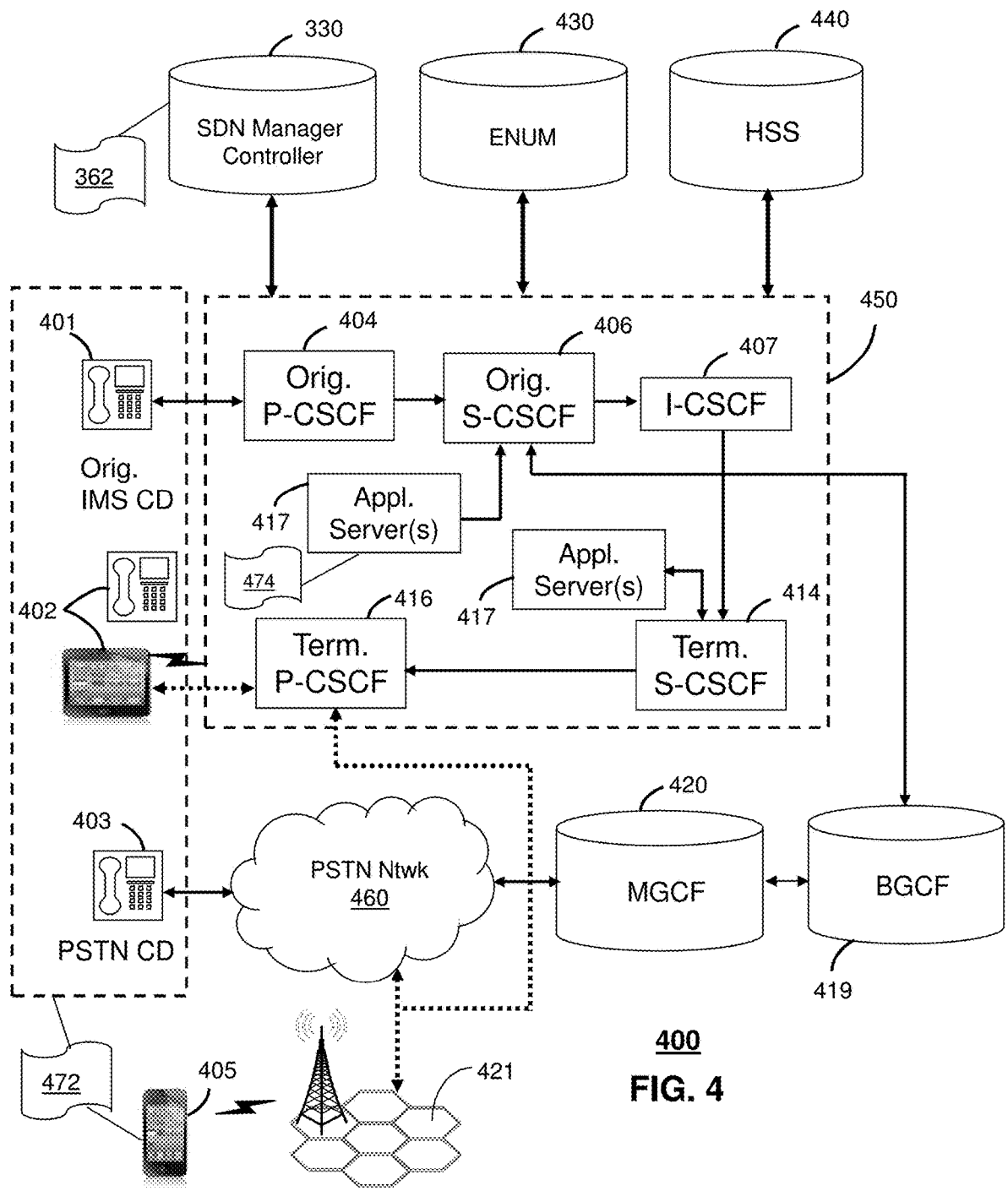

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 of FIG. 1 and communication system 300 as another representative embodiment of communication system 300. The subject disclosure describes, among other things, illustrative embodiments for adapting a communication network to provide services to communication devices. A Software Define Network (SDN) Management Controller can receive and processor requests for services. The Manager SDN Controller can determine, from a service layer and/or from past history, resource and/or requirement for providing the service. The Manager SDN Controller can compare these requirements to resources that are available from SDN Controllers that have been previously instantiated and configured by the Manager SDN Controller. If the previously instantiated SDN Controllers lake sufficient capability and/or capacity, then the Manager SDN Controller can instantiated additional SDN Controllers for providing these resources. The Manager SDN Controller operates at level 3, while the SDN Controllers direct control and data paths at level 2. The SDN Controllers also direct resources, including Network Function Virtualization (NFV) at the level 1. Other embodiments are described in the subject disclosure.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 300 of FIG. 3.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The Manager SDN Controller 330 of FIG. 3 can be operably coupled to communication system 300 for purposes similar to those described above. Manager SDN Controller 330 can perform function 362 and thereby provide adaptation of the communication system 100 for providing services to the CDs 401, 402, 403 and 405 of FIG. 4 similar to the functions described for Manager SDN Controller 130 of FIG. 1 in accordance with method 200 of FIG. 2. CDs 401, 402, 403 and 405, which can be adapted with software to perform function 472 to utilize the services of the Manager SDN Controller 330 similar to the functions described for communication devices 116 of FIG. 1 in accordance with method 200 of FIG. 2. Manager SDN Controller 330 can be an integral part of the application server(s) 417 performing function 474, which can be substantially similar to function 364 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
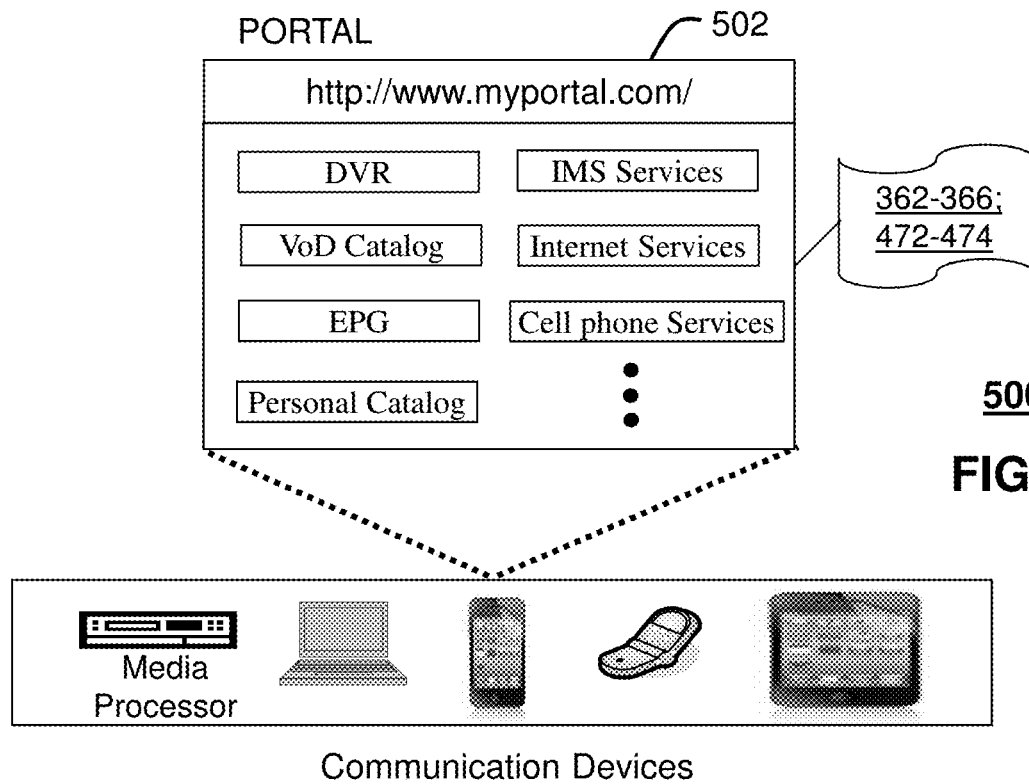
FIG. 5 depicts an illustrative embodiment of a web portal for interacting with the communication systems of FIGS. 1 and 3-4.

FIG. 5 depicts an illustrative embodiment of a web portal 502 of a communication system 500. Communication system 500 can be overlaid or operably coupled with system 100 of FIG. 1, communication system 300, and/or communication system 400 as another representative embodiment of system 100 of FIG. 1, communication system 300, and/or communication system 400. The web portal 502 can be used for managing services of system 100 of FIG. 1 and communication systems 300-400. A web page of the web portal 502 can be accessed by a Uniform Resource Locator (URL) with an Internet browser using an Internet-capable communication device such as those described in FIG. 1 and FIGS. 3-4. The web portal 502 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 306. The web portal 502 can also be used for provisioning IMS services described earlier, provisioning Internet services, provisioning cellular phone services, and so on.

The web portal 502 can further be utilized to manage and provision software applications 362-366, and 472-474 to adapt these applications as may be desired by subscribers and/or service providers of system 100 of FIG. 1, and communication systems 300-400. For instance, users of the services provided by Manager SDN Controller 130 or 430 can log into their on-line accounts and provision the Manager SDN Controller 110 or 430 with describe a feature that a user may want to program such as user profiles, provide contact information to server to enable it to communication with devices described in FIGS. 1-4 and so on. Service providers can log onto an administrator account to provision, monitor and/or maintain the system 100 of FIG. 1 or Manager SDN Controller 430.

Figure 6:
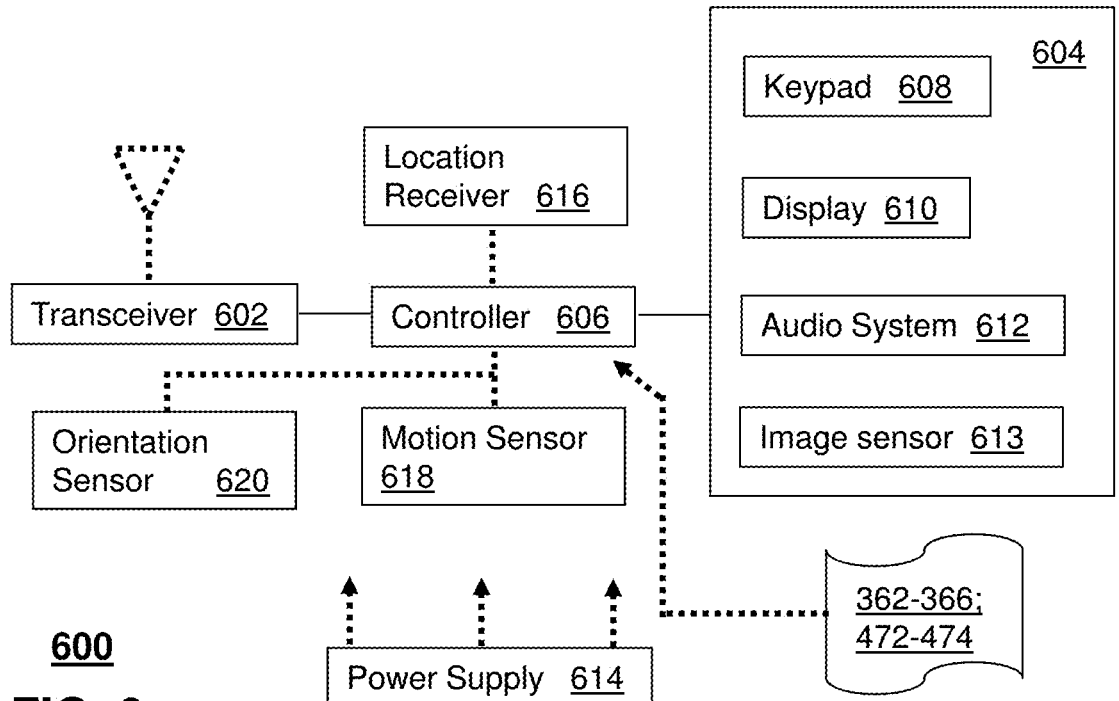
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1 and FIGS. 3-4 and can be configured to perform portions of method 200 of FIG. 2.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth and ZigBee® are trademarks registered by the Bluetooth Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIG. 1, the media processor 306, the media devices 308, or the portable communication devices 316 of FIG. 3, as well as the IMS CDs 401-402 and PSTN CDs 403-405 of FIG. 4. It will be appreciated that the communication device 600 can also represent other devices that can operate in systems of FIG. 1, communication systems 300-400 of FIGS. 3-4 such as a gaming console and a media player. In addition, the controller 606 can be adapted in various embodiments to perform the functions 362-366 and 472-474, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
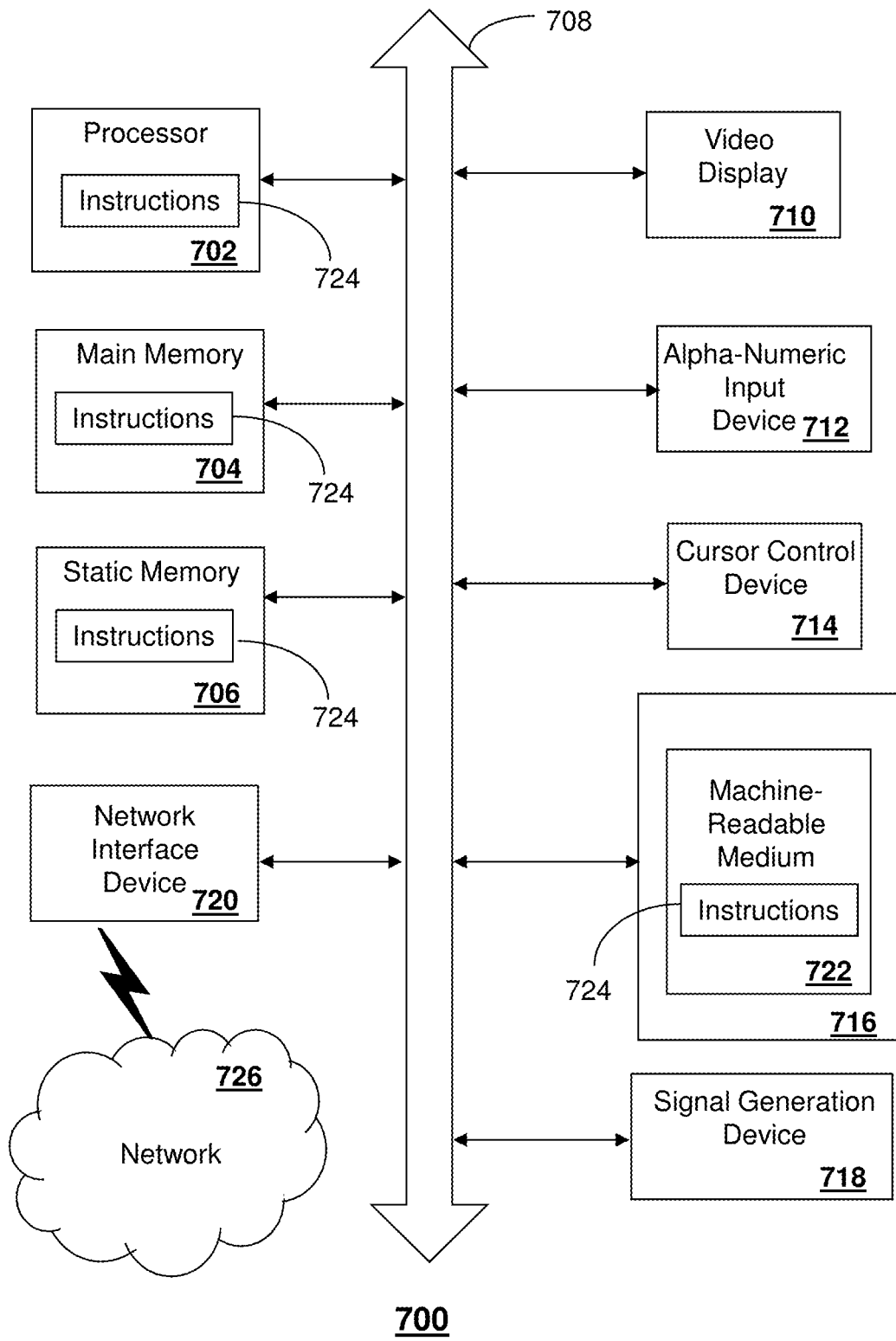
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the Manager SDN Controller 130, the SDN Controllers 135-145, and the communication device 116 in FIG. 1. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising executable instructions that, when executed by a processing system including a processor, facilitate performance of operations, the operations comprising:
    detecting a first service request via a network;
    generating a query to service layer equipment according to the first service request that is received;
    obtaining, from the service layer equipment, a first plurality of service requirements to fulfill the first service request responsive to the query;
    generating, responsive to receiving the first plurality of service requirements, a request for network resource capacity information to a plurality of instantiated software defined network controllers, previously instantiated into the network;
    obtaining network capacity information from the plurality of instantiated software defined network controllers;
    identifying a shortfall of software defined network controllers according to the first plurality of service requirements and to the network capacity information of the plurality of instantiated software defined network controllers;
    instantiating into the network, another software defined network controller, responsive to the shortfall, to fulfill the first service request, wherein the first plurality of service requirements are met, in part, by the plurality of instantiated software defined network controllers and, in part, by the another software defined network controller;
    prioritizing the plurality of instantiated software defined network controllers according to the first plurality of service requirements to obtain a first prioritized plurality of instantiated software defined network controllers, wherein the first prioritized plurality of instantiated software defined network controllers are configured according to the first plurality of service requirements; and
    reprioritizing the first prioritized plurality of instantiated software defined network controllers and the another software defined network controller to obtain a second prioritized plurality of instantiated software defined network controllers comprising the plurality of instantiated software defined network controllers and the another software defined network controller configured to support the first service request.

2. The non-transitory, machine-readable storage medium of claim 1, wherein the identifying of the shortfall of software defined network controllers further comprises:
    determining a shortage in a first network resource; and
    transmitting a second communication to a first software defined network controller of the plurality of instantiated software defined network controllers to direct the first software defined network controller to instantiate a first virtual network function to compensate for the shortage in the first network resource.

3. The non-transitory, machine-readable storage medium of claim 2, wherein the operations further comprise:
    receiving a first communication from the first software defined network controller of the plurality of instantiated software defined network controllers;
    determining an excess in a first network resource according to the first communication; and
    transmitting a second communication to the first software defined network controller of the plurality of instantiated software defined network controllers to direct the first software defined network controller of the plurality of instantiated software defined network controllers to decommission a first virtual network function to compensate for the excess in the first network resource.

4. The non-transitory, machine-readable storage medium of claim 2, wherein the operations further comprise:
    receiving a first communication from a first software defined network controller of the plurality of instantiated software defined network controllers, wherein the determining the shortage in the first network resource is according to the first communication.

5. The non-transitory, machine-readable storage medium of claim 1, wherein the operations further comprise:
    storing a first configuration associated with the first service request, wherein the first configuration includes information identifying the plurality of instantiated software defined network controllers and a first plurality of priorities.

6. The non-transitory, machine-readable storage medium of claim 1, wherein the operations further comprise:
    determining whether the first plurality of service requirements to fulfill the first service request is associated with a previously saved configuration.

7. The non-transitory, machine-readable storage medium of claim 6, wherein the operations further comprise:
    accessing the previously saved configuration, wherein the plurality of instantiated software defined network controllers are further determined according to the previously saved configuration that is accessed.

8. A software defined network manager, comprising:
    a processing system including a processor; and
    a memory that stores executable instructions that, when executed by the processing system, facilitate performance of operations, the operations comprising:
        receiving a first service request via a network;
        transmitting a query to service layer equipment according to the first service request that is received;
        receiving, from the service layer equipment, a first plurality of service requirements to fulfill the first service request responsive to the query;
        transmitting, responsive to receiving the first plurality of service requirements, a request for network resource capacity information to a plurality of instantiated software defined network controllers, previously instantiated into the network; and
        receiving network capacity information from the plurality of instantiated software defined network controllers;
        determining an insufficiency of software defined network controllers according to the first plurality of service requirements and the network capacity information of the plurality of instantiated software defined network controllers, to obtain a determined insufficiency;
        instantiating into the network, another software defined network controller, responsive to the determined insufficiency, to fulfill the first service request, wherein the first plurality of service requirements are met, in part, by the plurality of instantiated software defined network controllers that are instantiated and, in part, by the another software defined network controller;

prioritizing the plurality of instantiated software defined network controllers according to the first plurality of service requirements to obtain a first prioritized plurality of instantiated software defined network controllers, wherein the first prioritized plurality of instantiated software defined network controllers are configured according to the first plurality of service requirements; and reprioritizing the first prioritized plurality of instantiated software defined network controllers and the another software defined network controller to obtain a second prioritized plurality of instantiated software defined network controllers comprising the plurality of instantiated software defined network controllers and the another softwawre defined network controller configured to support the first service request.

9. The software defined network manager of claim 8, wherein the determining of the insufficiency of software defined network controllers further comprises:

determining a shortage in a first network resource; and
transmitting a second communication to a first software defined network controller of the plurality of instantiated software defined network controllers to direct the first software defined network controller to instantiate a first virtual network function to compensate for the shortage in the first network resource.

10. The software defined network manager of claim 9, wherein the operations further comprise:

receiving a first communication from the first software defined network controller of the plurality of instantiated software defined network controllers;
determining an excess in a first network resource according to the first communication; and
transmitting a second communication to the first software defined network controller of the plurality of instantiated software defined network controllers to direct the first software defined network controller of the plurality of instantiated software defined network controllers to decommission a first virtual network function to compensate for the excess in the first network resource.

11. The software defined network manager of claim 9, wherein the operations further comprise:

receiving a first communication from a first software defined network controller of the plurality of instantiated software defined network controllers, wherein the determining the shortage in the first network resource is according to the first communication.

12. The software defined network manager of claim 8, wherein the operations further comprise:

storing a first configuration associated with the first service request, wherein the first configuration includes information identifying the plurality of instantiated software defined network controllers and a first plurality of priorities.

13. The software defined network manager of claim 8, wherein the operations further comprise:

determining whether the first plurality of service requirements to fulfill the first service request is associated with a previously saved configuration.

14. The software defined network manager of claim 13, wherein the operations further comprise:

accessing the previously saved configuration, wherein the plurality of instantiated software defined network controllers are further determined according to the previously saved configuration that is accessed.

15. A method, comprising:

receiving, by a processing system including a processor, a first service request via a network;
providing, by the processing system, a query to service layer equipment according to the first service request that is received;
obtaining, by the processing system and from the service layer equipment, a first plurality of service requirements to fulfill the first service request responsive to the query;
providing, by the processing system and responsive to receiving the first plurality of service requirements, a request for network resource capacity information to a plurality of instantiated software defined network controllers, previously instantiated into the network; and
obtaining, by the processing system, network capacity information from the plurality of instantiated software defined network controllers;
determining, by the processing system, an insufficiency of software defined network controllers according to the first plurality of service requirements and the network capacity information of the plurality of instantiated software defined network controllers, to obtain a determined insufficiency;
instantiating, by the processing system, into the network, another software defined network controller, responsive to the determined insufficiency, to fulfill the first service request, wherein the first plurality of service requirements are met, in part, by the plurality of instantiated software defined network controllers that are instantiated and, in part, by the another software defined network controller
prioritizing, by the processing system, the plurality of instantiated software defined network controllers according to the first plurality of service requirements to obtain a first prioritized plurality of instantiated software defined network controllers, wherein the first prioritized plurality of instantiated software defined network controllers are configured according to the first plurality of service requirements; and
reprioritizing, by processing system, the first prioritized plurality of instantiated software defined network controllers and the another software defined network controller to obtain a second prioritized plurality of instantiated software defined network controllers comprising the plurality of instantiated software defined network controllers and the another software defined network controller configured to support the first service request.

16. The method of claim 15, wherein the determining of the insufficiency further comprises:

detecting, by the processing system, a first communication from a first software defined network controller of the plurality of instantiated software defined network controllers;
determining, by the processing system, a shortage in a first network resource according to the first communication; and
providing, by the processing system, a second communication to the first software defined network controller of the plurality of instantiated software defined network controllers to direct the first software defined network controller to instantiate a first virtual network function to compensate for the shortage in the first network resource.

17. The method of claim 16, further comprising:
obtaining, by the processing system, a first communication from the first software defined network controller of the plurality of instantiated software defined network controllers;
determining, by the processing system an excess in a first network resource according to the first communication; and
providing, by the processing system, a second communication to the first software defined network controller of the plurality of instantiated software defined network controllers to direct the first software defined network controller of the plurality of instantiated software defined network controllers to decommission a first virtual network function to compensate for the excess in the first network resource.

18. The method of claim 15, further comprising:
determining, by the processing system, whether the first plurality of service requirements to fulfill the first service request is associated with a previously saved configuration; and
accessing, by the processing system, the previously saved configuration, wherein the fs plurality of instantiated software defined network controllers are further determined according to the previously saved configuration that is accessed.

19. The method of claim 15, further comprising:
storing a first configuration associated with the first service request.

20. The method of claim 19, wherein the first configuration includes information identifying the plurality of instantiated software defined network controllers and a first plurality of priorities.

* * * * *